United States Patent [19]

Buchele

[11] 4,338,155
[45] Jul. 6, 1982

[54] METHOD AND APPARATUS FOR INDEXING CONTAINERS TO BE LABELED

[75] Inventor: Byron D. Buchele, Muscatine, Iowa
[73] Assignee: H. J. Heinz Company, Pittsburgh, Pa.
[21] Appl. No.: 151,800
[22] Filed: May 21, 1980
[51] Int. Cl.³ .................... B65C 9/02; B65C 9/06
[52] U.S. Cl. .................. 156/539; 156/567; 156/DIG. 3; 156/DIG. 25; 156/DIG. 27
[58] Field of Search ....... 156/567, DIG. 25, DIG. 27, 156/DIG. 12, 566, 475, 560, DIG. 3; 198/382, 383

[56] References Cited

U.S. PATENT DOCUMENTS

| 1,053,898 | 2/1913 | Bogdanffy | 156/567 |
|---|---|---|---|
| 1,143,353 | 6/1915 | Bogdanffy | 156/567 |
| 1,188,753 | 6/1916 | Gaynor | 156/567 |
| 3,709,755 | 1/1973 | Wochner | 156/567 |
| 3,948,711 | 4/1976 | Piatek | 156/567 |
| 4,201,621 | 5/1980 | Crankshaw et al. | 156/567 |
| 4,203,798 | 5/1980 | Yamashita | 156/567 |

FOREIGN PATENT DOCUMENTS

| 2255492 | 9/1973 | Fed. Rep. of Germany | 156/567 |
|---|---|---|---|
| 206384 | 12/1967 | U.S.S.R. | 156/567 |

Primary Examiner—Michael G. Wityshyn
Attorney, Agent, or Firm—Paul & Paul

[57] ABSTRACT

A method and apparatus for properly positioning multi-faced containers to facilitate the proper application of labels. This invention, used in conjunction with labeling machines having star-wheel feed mechanisms, facilitates the proper indexing of multi-faced containers to insure that labels are applied consistently in the proper position. This invention may be used with multi-faced containers having any number of flat sides.

3 Claims, 5 Drawing Figures

METHOD AND APPARATUS FOR INDEXING CONTAINERS TO BE LABELED

BACKGROUND AND SUMMARY OF THE INVENTION

The present invention relates to an improvement for use in conjunction with conventional container-labeling machines.

State of the art labeling machines have been used for some time to apply labels to containers. These machines operate at relatively high speeds and are well suited to apply labels to round containers. For example, a labeling machine manufactured and sold by Jagenberg of Canada Limited designated the Jagenberg Solar Labeler is designed to handle a variety of bottle sizes at speeds up to a thousand bottles per minute. This labeler is capable of applying any combination of labels such as front and back, body and neck, full wrap neck and aluminum foil overlap.

The Jagenberg labeler, and other machines of similar design, cannot be used effectively to label multi-faced containers because the star-wheel feed mechanism of the labeler does not index the containers before applying labels. Thus, there is no assurance that the labels will be applied with the proper orientation on the flat faces of the container. Accordingly, labels may be misoriented, as shown in FIG. 1. The method and apparatus of the present invention allows for the proper placement of labels on multi-faced containers, as shown in FIG. 2.

For purposes of this disclosure "indexing" means orienting a multi-faced container into a specific position.

BRIEF DESCRIPTION OF THE DRAWINGS

Additional objects and advantages of the present invention will become apparent from the following detailed descriptions of the preferred embodiments which make reference to the following set of drawings of which.

DETAILED DESCRIPTION OF THE PREFERRED EMBODIMENTS

The present invention is to be used in conjunction with state of the art labeling machines which employ star-wheel feed mechanisms. The objective of the instant invention is to properly position multi-faced containers prior to the application of labels so that the labels will be applied properly on the flat faces of the containers.

Figure 1:
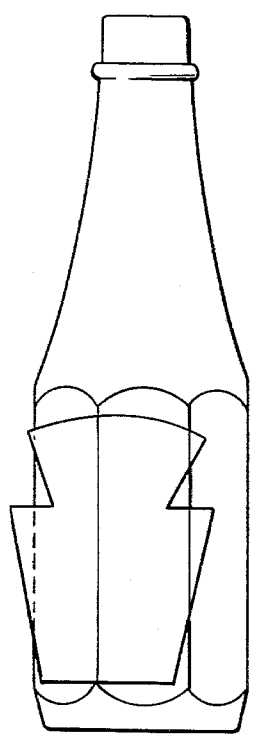
FIG. 1 is a perspective view of a multi-faced container and label.

FIG. 1 illustrates the misapplication of a label on a multi-faced container. This misapplication is unsatisfactory not only because of the unsightly appearance it presents but because portions of the label do not adhere properly to the container when so positioned. This non-adherence is illustrated in FIG. 1 wherein a corner of the label is shown to extend away from the container.

Figure 2:
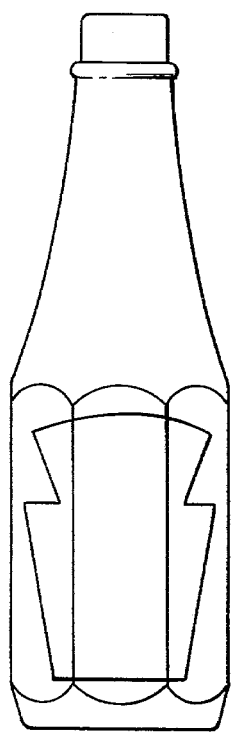
FIG. 2 is a perspective view of a multi-faced container and label.

FIG. 2 illustrates the proper application of a label upon a multi-faced container. The container illustrated is the well known catsup bottle, but of course the disclosed method and apparatus may be used with any flat-faced multi-side container. The application of labels upon any multi-faced container usually requires that the labels be properly positioned to present a satisfactory aesthetic appearance and to insure that the label adheres properly to the container.

Figure 3:
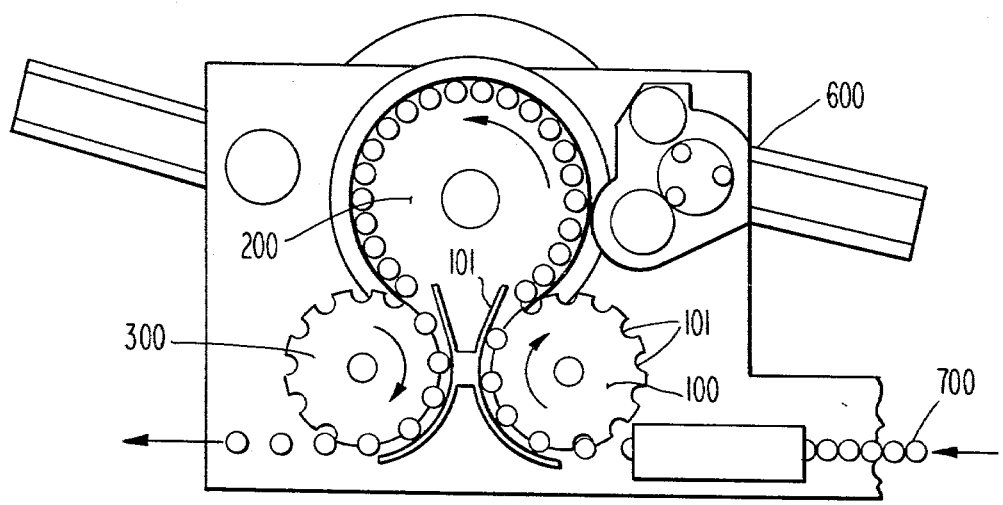
FIG. 3 is a schematic view of a star-wheel feed mechanism for use in a labeling machine.

FIG. 3 is a schematic representation of a star-wheel feed mechanism employed by state of the art labeling machines. As shown schematically, containers enter from a conveyor belt on the right and enter star-wheel mechanism 100 which spaces the containers properly for subsequent application of labels. The containers remain within the indentations, 101, of star-wheel 100 as they are rotated into position for exit onto labeling table 200. As the containers exit star-wheel 100, a force is applied to the top of the containers by a mechanism, not shown, which holds the containers in fixed relation to table 200 as table 200 rotates the containers into position for the labels to be applied by a mechanism shown schematically in FIG. 3 as mechanism 600. The orientation of the containers on table 200 is fixed after the pressure is applied to the top of the containers.

FIG. 3 illustrates schematically a labeling feed mechanism used in conjunction with containers having circular cross-section, 700. Of course, it is not necessary to orient containers having a circular cross-section prior to labeling them because such containers are completely symmetrical and therefore always properly positioned for the application of labels. However, this mechanism is not satisfactory for use with multi-faced containers because the orientation of the containers can vary from bottle to bottle as they are presented to labeling mechanism 600 which results in labels being applied improperly as illustrated in FIG. 1.

Figure 4:
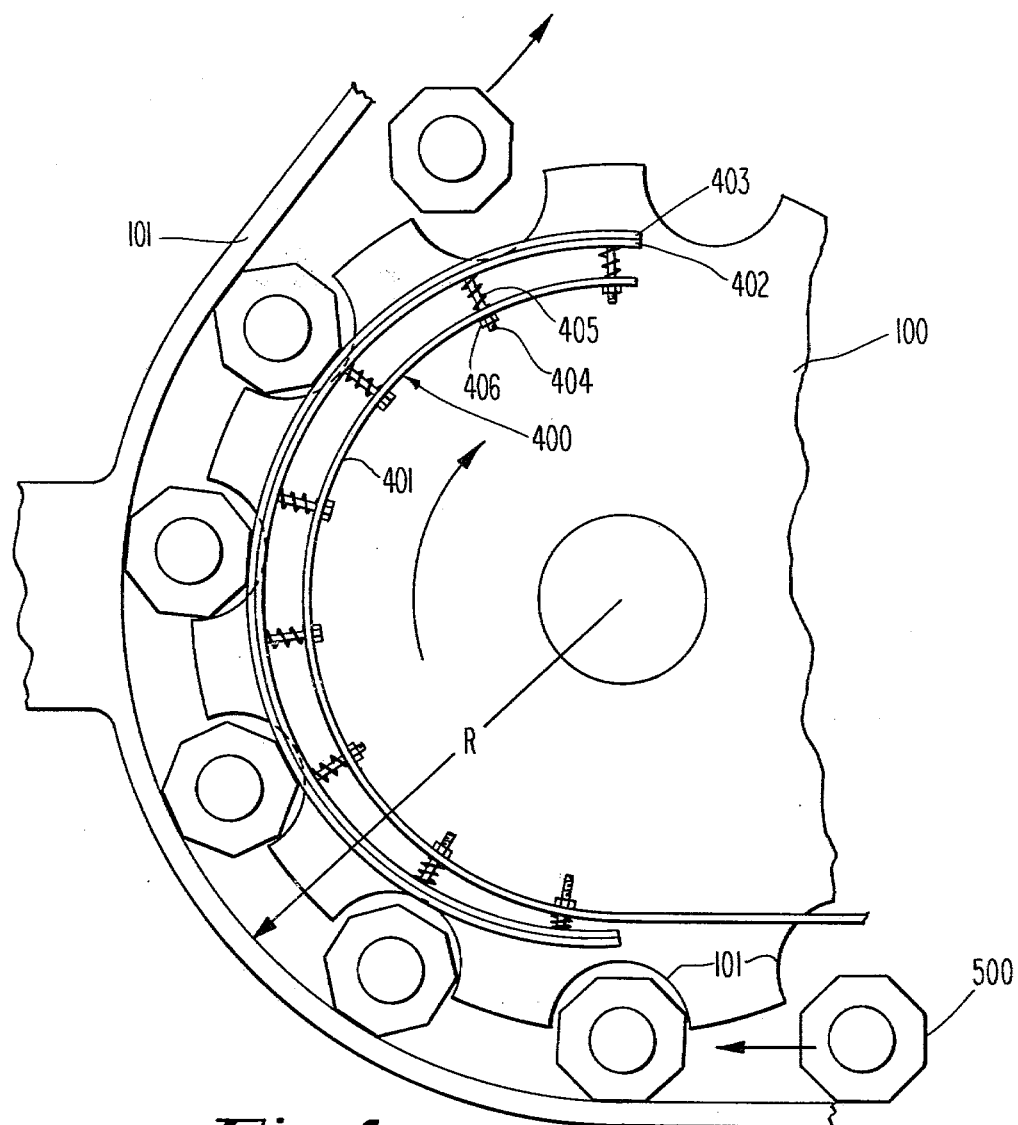
FIG. 4 is a top view of the indexing mechanism of the present invention together with a schematic representation of a labeler feed mechanism and multi-faced containers.

The apparatus of the instant invention is illustrated in FIG. 4. Guideway 400 is permanently mounted within the star-wheel feed mechanism to apply a fixed pressure to multi-faced containers passing through the feed mechanism such that the containers are all indexed into exactly the same orientation when discharged onto the labeling table where they are held in position by pressure applied to the top of the container as discussed above. Accordingly, the labeling mechanism 600 can be so adjusted that labels are consistently applied in the proper position as shown in FIG. 2.

Figure 5:
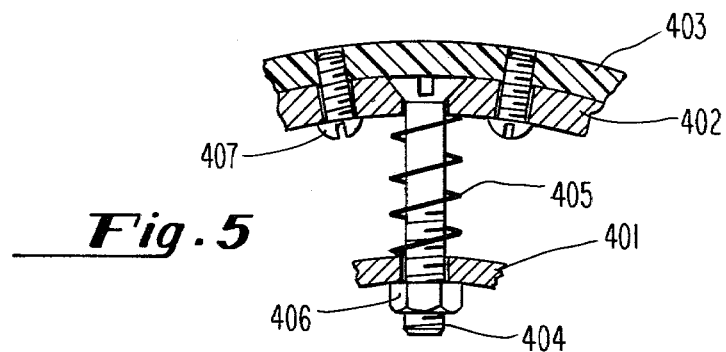
FIG. 5 is a cross-sectional view of a representative portion of the indexing mechanism of the present invention.

As shown in FIG. 4, guideway 400 is comprised of an inner support 401 and concentric outer members 402 and 403. Outer members 402 and 403 are connected to inner support 401 by means of supporting bolts 404, spring 405 and nuts 406. In a preferred embodiment inner support 401 is made of stainless steel one quarter inch thick and one and one half inches wide and outer supports 402 and 403 are both nylon strips one eighth inch thick by one inch wide. As shown in FIG. 5, supporting bolts 404 are counter-sunk to a depth equivalent to the mating surface of 402 and 403 and the two nylon strips are held together by screws 407. This is a matter of design choice only and many alternate configurations and materials could be used.

The apparatus of the instant invention, as shown in FIG. 4, operates as follows. Multi-faced containers, 500, enter the star-wheel mechanism 100 which rotates clockwise as shown. The orientation of containers entering the feed mechanism is arbitrary, that is to say the containers are free to rotate into any position as they enter the feed mechanism. As the containers rotate through the feed mechanism, the containers come into contact with the outer face of member 403. Member 403 is urged into position by concentric coil springs 405 and accordingly, member 403 may move towards member 401 to initially accommodate an improperly positioned container to avoid jamming the mechanism.

The position of member 403 is adjustable by movement of adjusting nuts 406. As shown schematically in FIG. 4, support member 403 is approximately concentric to the arc-like retainer 101 of the star-wheel feed mechanism. Adjustment of nuts 406 facilitates the positioning of member 403 such that a gradually increasing pressure is applied to containers 500 as they traverse the feed mechanism. This adjustable feature also facilitates the use of the same apparatus with containers of various sizes to accomodate production runs of containers of any size after a one-time adjustment. For example, if a container larger than the one illustrated were being labeled, it would be possible to adjust the position of member 403 such that a larger container could pass through the mechanism without jamming by positioning member 403 closer to support member 401.

The novel feature of the present invention is the use of a slight pressure to urge one face of multi-faced containers into sliding contact with the arc-like retainer wall 101 of the feed mechanism. This causes the containers to cease rotating and accordingly the container is properly positioned as it exits the star-wheel feed mechanism where it is held firmly in position on the labeling table.

In the preferred embodiment support member 403 is made of nylon which presents a smooth surface for engagement with containers 500. Retainer wall 101, as illustrated in FIG. 4, has an inner wall of radius "R". As illustrated, eight identical spring support assemblies are shown but this is a matter of design choice.

What is claimed is:

1. An indexing device for use with a labeler employing a star-wheel feed mechanism, said feed mechanism comprising a star-wheel and a concentric arc-shaped retainer of radius "R," the improvement comprising an arc-shaped guideway of a radius less than "R" concentric with said retainer adapted to apply an outward pressure against containers passing through said feed mechanism, said pressure being sufficient to force said containers into contact with the inner-face of said retainer thereby causing multi-faced containers to maintain one face in sliding contact with said retainer, said container exiting the feed mechanism properly positioned for the application of labels.

2. The indexing device of claim 1 wherein the guideway is mounted on a plurality of spring-biased supports, said springs urging the guideway into contact with containers passing between said guideway and retainer.

3. The indexing device of claim 2 wherein the spring supports position the guideway to facilitate application of a gradually increasing pressure upon containers passing through said feed mechanism.

* * * * *